(12) United States Patent
Benoit et al.

(10) Patent No.: US 9,621,549 B2
(45) Date of Patent: Apr. 11, 2017

(54) INTEGRATED CIRCUIT FOR DETERMINING WHETHER DATA STORED IN EXTERNAL NONVOLATIVE MEMORY IS VALID

(71) Applicant: QUALCOMM Incorporated, San Diego, CA (US)

(72) Inventors: Olivier Jean Benoit, San Diego, CA (US); Laurence Geoffrey Lundblade, San Diego, CA (US); Asaf Ashkenazi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/341,703

(22) Filed: Jul. 25, 2014

(65) Prior Publication Data

US 2016/0028725 A1    Jan. 28, 2016

(51) Int. Cl.
*H04L 29/06* (2006.01)
*G06F 21/64* (2013.01)
*G06F 21/79* (2013.01)
*G06F 17/30* (2006.01)

(52) U.S. Cl.
CPC .... *H04L 63/0869* (2013.01); *G06F 17/30371* (2013.01); *G06F 21/645* (2013.01); *G06F 21/79* (2013.01); *H04L 63/1466* (2013.01)

(58) Field of Classification Search
None
See application file for complete search history.

(56) References Cited

U.S. PATENT DOCUMENTS

| 6,182,086 | B1 | 1/2001 | Lomet et al. | |
|---|---|---|---|---|
| 6,578,041 | B1 | 6/2003 | Lomet | |
| 8,171,547 | B2* | 5/2012 | Thorley | G06F 21/552 |
| | | | | 713/1 |
| 9,171,187 | B2* | 10/2015 | Asokan | G06F 21/606 |

(Continued)

FOREIGN PATENT DOCUMENTS

| EP | 2343662 A1 | 7/2011 | |
|---|---|---|---|
| WO | WO 2010/052722 A1 * | 5/2010 | G06F 21/02 |

OTHER PUBLICATIONS

International Search Report and Written Opinion—PCT/US2015/041941—ISA/EPO—Sep. 18, 2015.

*Primary Examiner* — Christopher Revak
(74) *Attorney, Agent, or Firm* — Loza & Loza, LLP

(57) ABSTRACT

An integrated circuit may comprise a secure volatile memory configured to store first data-validity information associated with first data stored in an external nonvolatile memory; and a secure processor configured to: retrieve the first data-validity information from a secure remote server over a secure communication channel, wherein the secure processor uses mutual authentication with the secure remote server to secure the secure communication channel; store the first data-validity information in the secure volatile memory; retrieve the first data from the external nonvolatile memory; obtain second data-validity information associated with the first data; compare the first data-validity information stored in the secure volatile memory with the second data-validity information to generate a comparison value; and determine, based on the comparison value, whether the first data is valid.

30 Claims, 9 Drawing Sheets

(56) References Cited

U.S. PATENT DOCUMENTS

| | | | |
|---|---|---|---|
| 2003/0079122 A1* | 4/2003 | Asokan | G06Q 20/04 713/156 |
| 2003/0196087 A1* | 10/2003 | Stringer | G06F 21/6209 713/171 |
| 2004/0133876 A1* | 7/2004 | Sproule | G06Q 10/063 717/105 |
| 2007/0067373 A1 | 3/2007 | Higgins et al. | |
| 2009/0010439 A1* | 1/2009 | Okamoto | G06F 21/10 380/280 |
| 2009/0100272 A1 | 4/2009 | Smeets | |
| 2009/0113117 A1 | 4/2009 | Dolgunov et al. | |
| 2011/0010720 A1* | 1/2011 | Smith | G06F 21/00 718/102 |
| 2012/0102334 A1* | 4/2012 | O'Loughlin | G06F 21/57 713/189 |
| 2012/0110343 A1 | 5/2012 | Bandic et al. | |
| 2012/0137126 A1* | 5/2012 | Matsuoka | H04L 9/0838 713/156 |
| 2013/0004142 A1* | 1/2013 | Grab | H04N 5/913 386/259 |
| 2013/0167234 A1* | 6/2013 | Falk | H04L 1/24 726/23 |
| 2013/0297948 A1* | 11/2013 | Lee | G06F 21/602 713/193 |
| 2014/0040208 A1 | 2/2014 | Graefe et al. | |
| 2015/0235053 A1* | 8/2015 | Lee | G06F 21/72 713/193 |

\* cited by examiner

INTEGRATED CIRCUIT FOR DETERMINING WHETHER DATA STORED IN EXTERNAL NONVOLATIVE MEMORY IS VALID

BACKGROUND

Field

The present invention relates generally to determining whether data stored in an external nonvolatile memory is valid in order to prevent an attack such as a rollback attack.

Background

Current mobile devices use a System-on-Chip (SoC) architecture which is subject to data loss if a device experiences a loss of power due to, for example, a drained or removed battery. To retain the critical data in the event of a power loss, an SoC device may store critical data in external nonvolatile memory (NVM), such as flash memory. The critical data may be a backup of secure data stored in a page or segment of the SoC's internal memory. The critical data may support an added value service such as electronic money, coupon, ticket, Digital Right Object, etc. The external NVM memory is accessible to a Higher Level Operating System (HLOS) and, after a power loss event, the device may be subject to rollback attack (the replacement of current content in the NVM with older content), even in the presence of data encryption/authentication, when the critical data is restored from the NVM.

Embedding the NVM into secure areas of the SoC is not a practical solution to the rollback problem because incompatible semiconductor processes are used for the NVM and the SoC. Securing an external NVM with a key requires that the key be protected which may add significant cost to each mobile device.

There is therefore a need for a technique for countering attacks such as a rollback attack in mobile devices using an SoC architecture.

SUMMARY

An aspect of the present invention may reside in an integrated circuit, comprising: a processor configured to: retrieve the first data-validity information, associated with first data stored in an external nonvolatile memory, from a secure remote server over a secure communication channel, wherein the secure processor uses mutual authentication with the secure remote server to secure the secure communication channel; retrieve the first data from the external nonvolatile memory; obtain second data-validity information associated with the first data; compare the first data-validity information with the second data-validity information to generate a comparison value; and determine, based on the comparison value, whether the first data is valid.

In more detailed aspects of the invention, to obtain the second data-validity information may comprise to retrieve the second data-validity information from the external nonvolatile memory with the first data. The processor may be further configured to verify an integrity of the first data and the second data-validity information using an authentication code stored in the external nonvolatile memory and retrieved with the first data and the second data-validity information. The first data-validity information may comprise a count value, and the second data-validity information may comprise a count value. Alternatively, the first data-validity information may comprise a timestamp value, and the second data-validity information may comprise a timestamp value.

In other more detailed aspects of the invention, to obtain the second data-validity information may comprise to calculate the second data-validity information from the first data. To calculate the second data-validity information from the first data may comprise to calculate a hash based on the first data stored in the external nonvolatile memory. The first data-validity information may comprise a hash based on the first data.

In other more detailed aspects of the invention, the integrated circuit may further comprise a secure volatile memory configured to store the first data-validity information, and the processor may be a secure processor further configured to store the first data-validity information in the secure volatile memory. In addition, the secure processor may be further configured to: update the first data-validity information; write second data to the non-volatile memory over the first data; write the updated first data-validity information to the secure volatile memory; and forward the updated first data-validity information to the secure remote server over the secure communication channel. Also, the secure processor may be further configured to update the second data-validity information.

Another aspect of the invention may reside in a remote station, comprising: a processor configured to: retrieve the first data-validity information, associated with first data stored in a nonvolatile memory, from a secure remote server over a secure communication channel, wherein the processor uses mutual authentication with the secure remote server to secure the secure communication channel; retrieve the first data from the nonvolatile memory; obtain second data-validity information associated with the first data; compare the first data-validity information with the second data-validity information to generate a comparison value; and determine, based on the comparison value, whether the first data is valid.

Another aspect of the invention may reside in a remote station, comprising: means for retrieving first data-validity information, associated with first data stored in a nonvolatile memory, from a secure remote server over a secure communication channel, wherein mutual authentication with the secure remote server is used to secure the secure communication channel; means for retrieving the first data from the nonvolatile memory; means for obtaining second data-validity information associated with the first data; means for comparing the first data-validity information with the second data-validity information to generate a comparison value; and means for determining, based on the comparison value, whether the first data is valid. The integrated circuit may further comprise means for securely storing the first data-validity information.

Another aspect of the invention may reside in a computer program product, comprising: computer-readable medium, comprising: code for causing a computer to retrieving first data-validity information, associated with first data stored in an external nonvolatile memory, from a secure remote server over a secure communication channel, wherein mutual authentication with the secure remote server is used to secure the secure communication channel; code for causing the computer to retrieve the first data from the external nonvolatile memory; code for causing the computer to obtain second data-validity information associated with the first data; code for causing the computer to compare the first data-validity information with the second data-validity information to generate a comparison value; and code for causing the computer to determine, based on the comparison value, whether the first data is valid.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
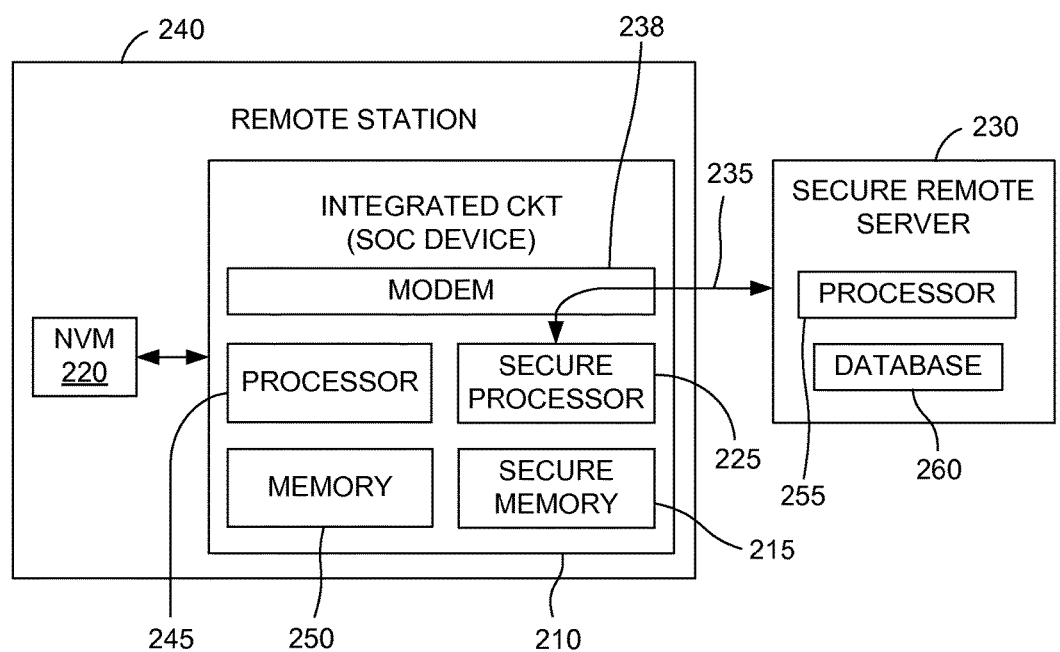
FIG. 2 is a block diagram of a remote station having an integrated circuit for implementing a technique for detecting invalid data using data-validity information stored in a secure remote server, according to an aspect of the present invention.

With reference to FIG. 2, an aspect of the present invention may reside in an integrated circuit 210, comprising: a processor 225 configured to: retrieve the first data-validity information, associated with first data stored in an external nonvolatile memory, from a secure remote server 230 over a secure communication channel 235, wherein the secure processor uses mutual authentication with the secure remote server to secure the secure communication channel; retrieve the first data from the external nonvolatile memory 220; obtain second data-validity information associated with the first data; compare the first data-validity information with the second data-validity information to generate a comparison value; and determine, based on the comparison value, whether the first data is valid.

In more detailed aspects of the invention, to obtain the second data-validity information may comprise to retrieve the second data-validity information from the external nonvolatile memory 220 with the first data. The processor 225 may be further configured to verify an integrity of the first data and the second data-validity information using an authentication code stored in the external nonvolatile memory 220 and retrieved with the first data and the second data-validity information. The first data-validity information may comprise a count value, and the second data-validity information may comprise a count value. Alternatively, the first data-validity information may comprise a timestamp value, and the second data-validity information may comprise a timestamp value.

In other more detailed aspects of the invention, to obtain the second data-validity information may comprise to calculate the second data-validity information from the first data. To calculate the second data-validity information from the first data may comprise to calculate a hash based on the first data stored in the external nonvolatile memory 220. The first data-validity information may comprise a hash based on the first data. The hash may be generated/calculated using a hash function such as SHA 1, SHA2, SHA3, SHA224, SHA256, SHA512, or the like.

In other more detailed aspects of the invention, the integrated circuit 210 may further comprise a secure volatile memory 215 configured to store the first data-validity information, and the processor 225 may be a secure processor further configured to store the first data-validity information in the secure volatile memory. In addition, the secure processor 225 may be further configured to: update the first data-validity information; write second data to the nonvolatile memory 220 over the first data; write the updated first data-validity information to the secure volatile memory 215; and forward the updated first data-validity information to the secure remote server 230 over the secure communication channel 235. Also, the secure processor may be further configured to update the second data-validity information.

The integrated circuit 210 may be a system-on-a-chip (SoC) device. The secure communication channel 235 may be facilitated by a modem 238.

The invention leverages the wireless connectivity of a remote device 240, such as a mobile phone, to implement a secure communication channel 235 with a secure remote server 230, to store data-validity information, such as an anti-rollback counter or timestamp. The invention may be implemented within the existing hardware capabilities of a typical remote device. Thus, the invention does not add to the hardware cost of the remote device. Further, the technique may provide a unique combination of security, authentication, and integrity, to protect against, for example, a rollback attack.

Another aspect of the invention may reside in an integrated circuit 210, comprising: means (e.g., 225, 310, 520, 820) for retrieving first data-validity information, associated with first data stored in an external nonvolatile memory 220, from a secure remote server 230 over a secure communication channel 235, wherein mutual authentication with the secure remote server is used to secure the secure communication channel; means (e.g., 225, 330, 610, 910) for retrieving the first data from the external nonvolatile memory; means (e.g., 225, 340, 610, 920) for obtaining second data-validity information associated with the first data; means (e.g., 225, 350, 650, 940) for comparing the first data-validity information with the second data-validity information to generate a comparison value; and means (e.g., 225, 360, 660/670, 950/960) for determining, based on the comparison value, whether the first data is valid. The integrated circuit may further comprise means (e.g., 215, 320, 530, 830) for securely storing the first data-validity information.

Another aspect of the invention may reside in a remote station 240, comprising: a secure processor 225 configured to: retrieve the first data-validity information, associated with first data stored in a nonvolatile memory 220, from a secure remote server 230 over a secure communication channel 235, wherein the secure processor uses mutual authentication with the secure remote server to secure the secure communication channel; retrieve the first data from the nonvolatile memory 220; obtain second data-validity information associated with the first data; compare the first data-validity information with the second data-validity information to generate a comparison value; and determine, based on the comparison value, whether the first data is valid.

Another aspect of the invention may reside in a remote station 240, comprising: means (e.g., 225, 310, 520, 820) for retrieving first data-validity information, associated with first data stored in a nonvolatile memory 220, from a secure remote server 230 over a secure communication channel 235, wherein mutual authentication with the secure remote server is used to secure the secure communication channel; means (e.g., 225, 330, 610, 920) for retrieving the first data from the nonvolatile memory; means (e.g., 225, 340, 610, 920) for obtaining second data-validity information associated with the first data; means (e.g., 225, 350, 650, 940) for comparing the first data-validity information with the second data-validity information to generate a comparison value; and means (e.g., 225, 360, 660/670, 950/960) for determining, based on the comparison value, whether the first data is valid.

Figure 1:
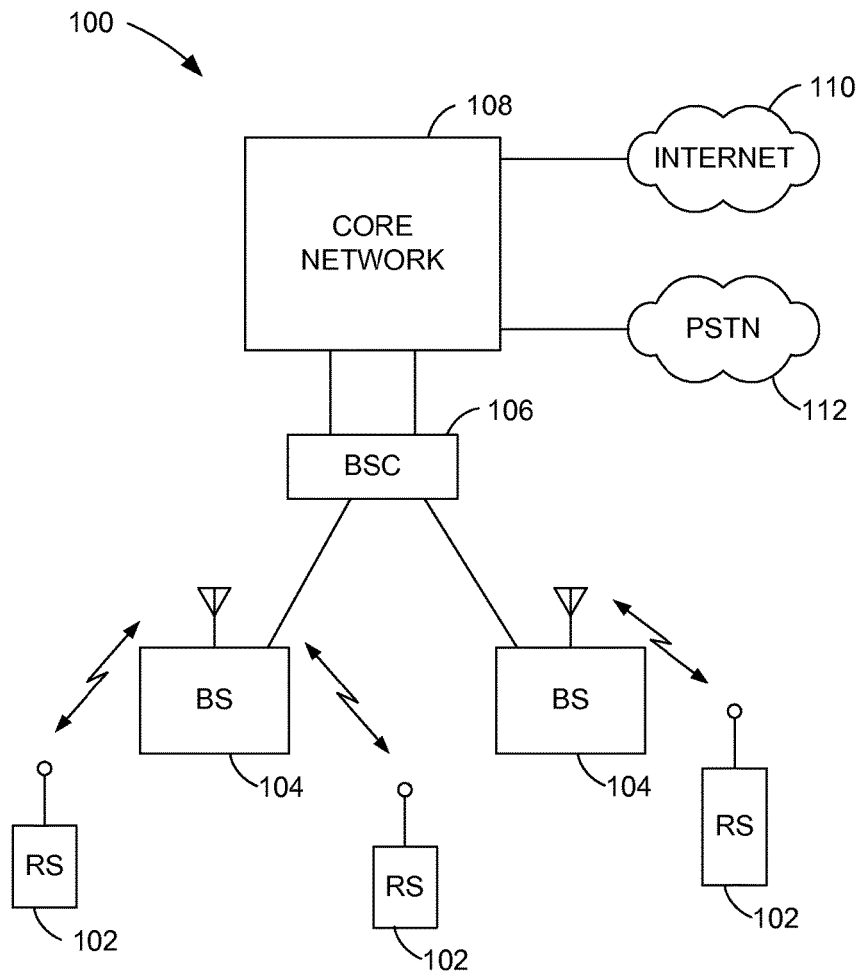
FIG. 1 is a block diagram of an example of a wireless communication system.
Figure 4:
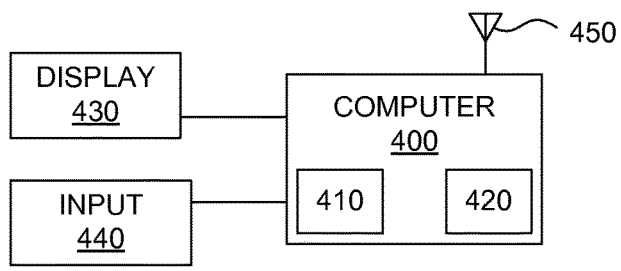
FIG. 4 is a block diagram of a computer including a processor and a memory.

With further reference to FIGS. 1 and 4, a remote station 102 may comprise a computer 400 that includes at least one processor 410 (e.g., the processor 245 in the integrated circuit 210 of FIG. 2), a storage medium 420 (such as a disk drive and/or memory 250 (FIG. 2)), a display 430, and an input such as a keypad 440, and a wireless connection 450 (such as a Wi-Fi connection and/or cellular connection). Similarly, with reference to FIG. 2, the secure remote server 230 may include a processor 255 and a storage medium such as memory for storing a database 260 that stores the first data-validity information.

Figure 3:
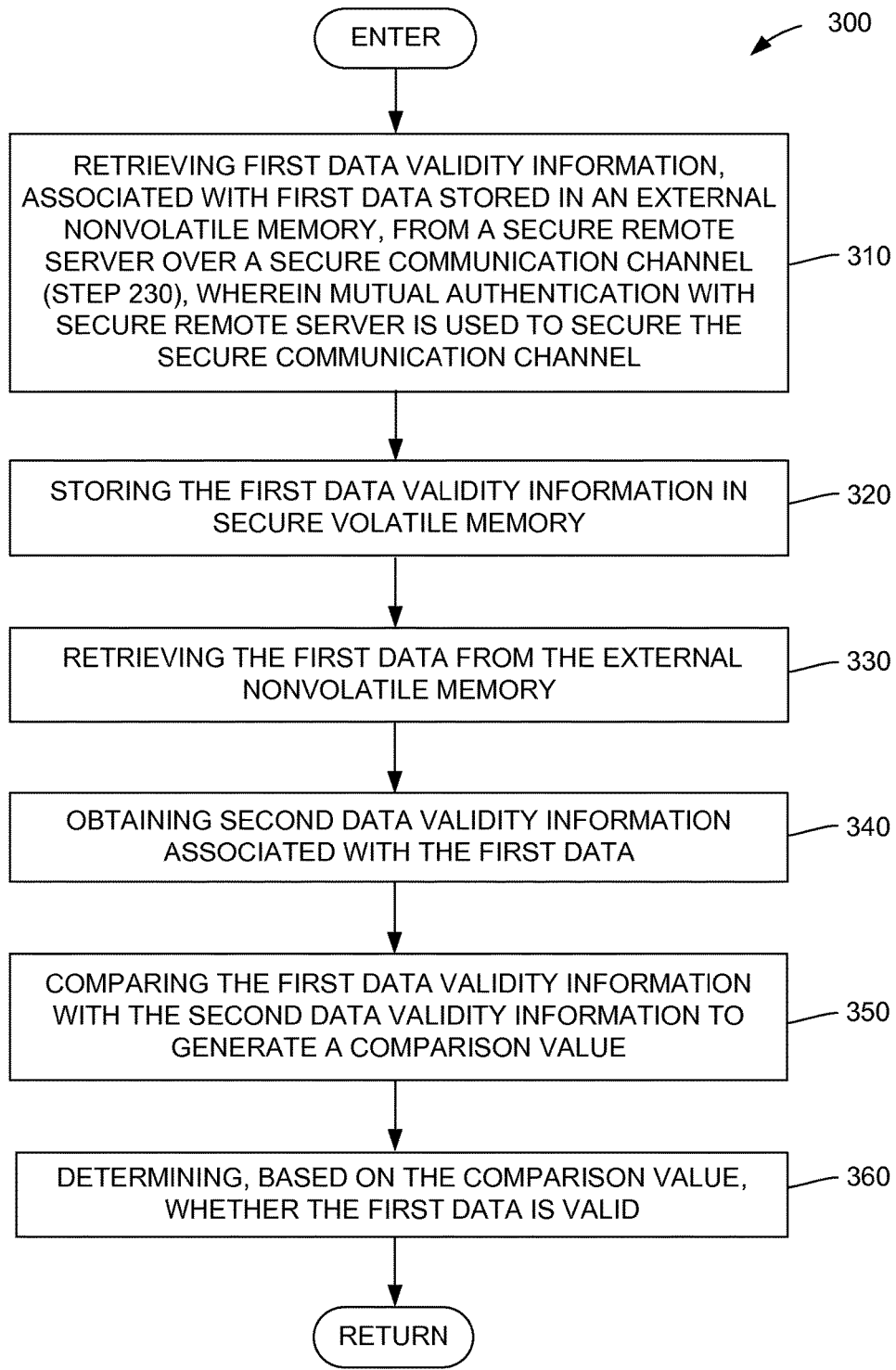
FIG. 3 is a block diagram of the method for detecting invalid data using data-validity information stored in a secure remote server, according to an aspect of the present invention.

Another aspect of the invention may reside in a method 300 (FIG. 3), comprising: retrieving first data-validity information, associated with first data stored in an external nonvolatile memory 220, from a secure remote server over a secure communication channel 235 (step 310), wherein mutual authentication with the secure remote server is used to secure the secure communication channel; storing the first data-validity information in secure volatile memory 215 (step 320); retrieving the first data from the external nonvolatile memory 220 (step 330); obtaining second data-validity information associated with the first data (step 340); comparing the first data-validity information with the second data-validity information to generate a comparison value (step 350); and determining, based on the comparison value, whether the first data is valid (step 360).

Another aspect of the invention may reside in a computer program product, comprising: computer-readable medium 420, comprising: code for causing a computer 400 to retrieve first data-validity information, associated with first data stored in an external nonvolatile memory 220, from a secure remote server 230 over a secure communication channel 235, wherein mutual authentication with the secure remote server is used to secure the secure communication channel; code for causing the computer to retrieve the first data from the external nonvolatile memory 215; code for causing the computer 400 to obtain second data-validity information associated with the first data; code for causing the computer 400 to compare the first data-validity information with the second data-validity information to generate a comparison value; and code for causing the computer 400 to determine, based on the comparison value, whether the first data is valid.

Figure 5:
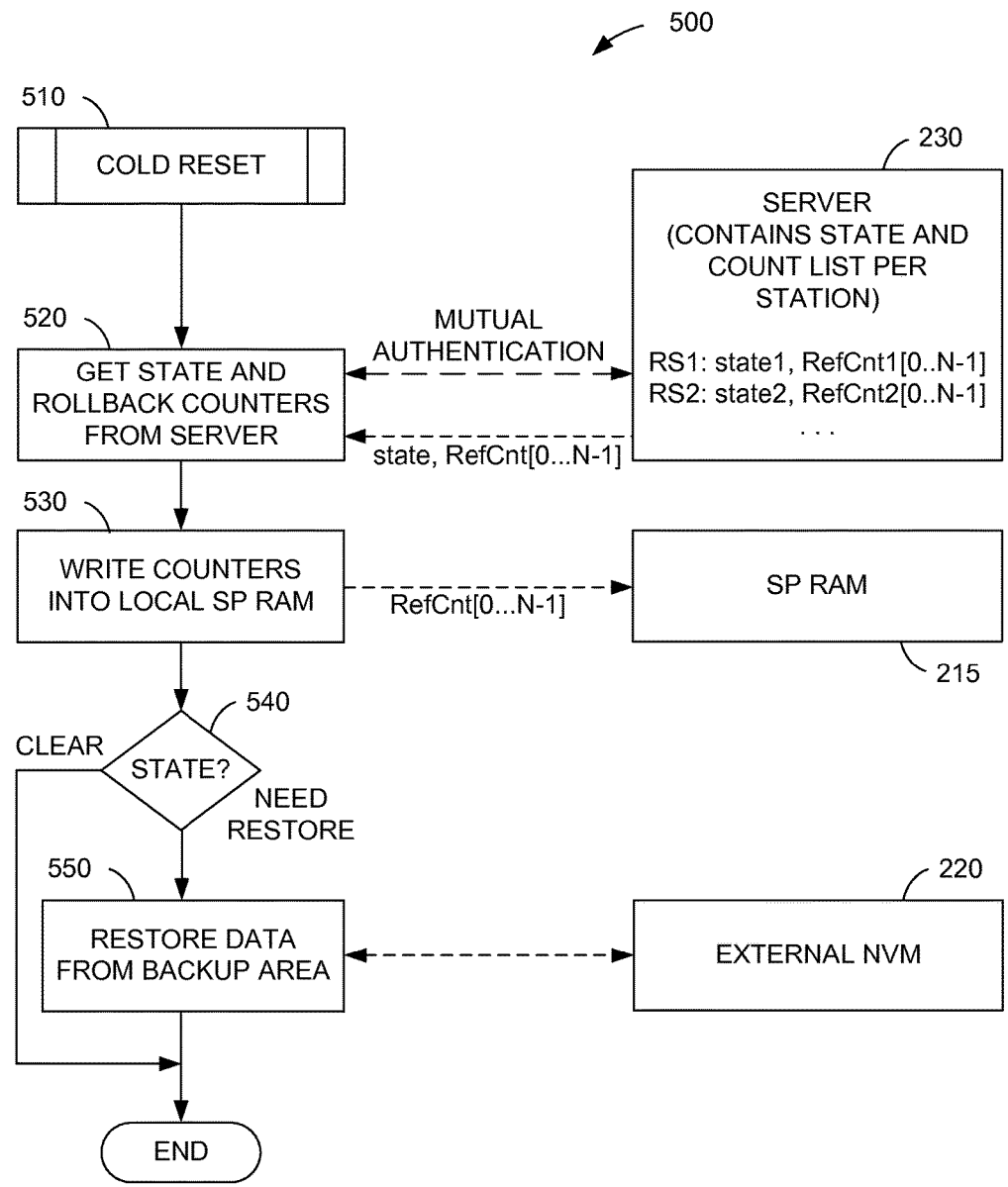
FIG. 5 is a block diagram of a method for a cold reset.

With reference to FIGS. 2 and 5, after a power loss or the like, a cold reset or startup/boot process 500 is executed by the secure processor (SP) 225 (step 510). A secure connection is established with the secure remote server 230 using mutual authentication. The mutual authentication may be based on a shared secret, or on public key cryptography with certificates. With a shared secret, the network connection may rely on a secret key stored in a subscriber identity module (SIM), included in the remote station 240, and in a home location registry (HLR) of a mobile network operator. As an example of public key cryptography, SSL relies on client (e.g., remote station 240) and server certificates. The secure remote server is secure both physically and logically from an attacker. The secure processor 225 gets/retrieves the state and anti-rollback counters (data-validity information) from the secure remote server 230 (step 520). There may be N anti-rollback counters RefCnt(0 . . . N−1) to accommodate a desired level of granularity of data segments in the nonvolatile memory 220. The secure processor writes the counter into the secure memory 215, i.e., local secure process random access memory (SP RAM) (step 530). The anti-rollback counters may be stored in the SP RAM for purposes of efficiency. Synchronizing with the server 230 is required for the next startup when the SP RAM loses its contents due to a cold reset/power loss.

A backup and restore feature improves reliability. If a sudden power loss occurs, e.g., the battery is removed, wrong data may prevent the system from recovering. A state is checked (step 540), and if a restore is needed, the original first data (that was saved in a backup area prior to update) may be restored to the nonvolatile memory 220 from a backup area (step 550). The startup process then ends.

Figure 6:
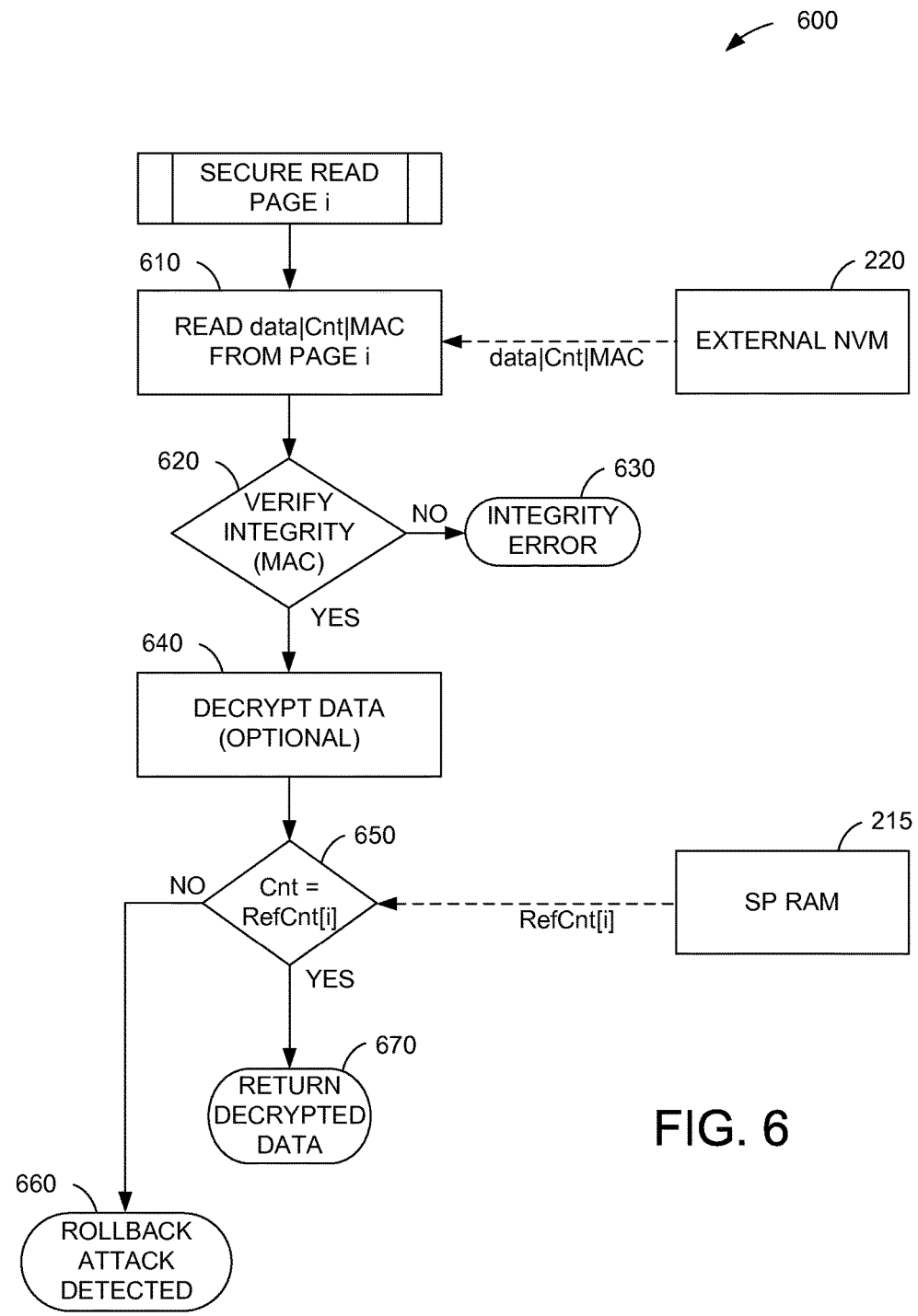
FIG. 6 is a block diagram of a method for a secure read of a page.

With reference to FIGS. 2 and 6, the secure processor 225 may perform a secure read process (600) to read data from the external nonvolatile memory 220 (step 610). Each page i or data blob (block of bytes) may contain: data (payload), an anti-rollback counter (Cnt), and a message authentication code (MAC). The MAC may be a keyed hash or a digital signature of the data and counter for authentication and integrity protection. The integrity of the page/blob is verified using the MAC (step 620). To verify the integrity, another MAC may be calculated over the payload data and the counter, and compared with the MAC read with the page/blob. The system is notified of an integrity error (step 630). Thus, an attacker cannot successfully modify the anti-rollback counter because the MAC will be wrong and the attacker is unable to compute a new MAC. The payload data may be decrypted if encrypted for confidentiality (step 640). The anti-rollback counter Cnt is compared with the reference counter stored in the SP RAM (step 650). If an anti-rollback attack is detected, i.e., the data is invalid (step 660), then the system is alerted. Otherwise, the data is returned (step 670). Although an attacker may replace a page/blob by an older version, the count of the anti-rollback counter will not match the count of the other anti-rollback counter securely retrieved from the remote server 230 and stored in the SP RAM.

Figure 7:
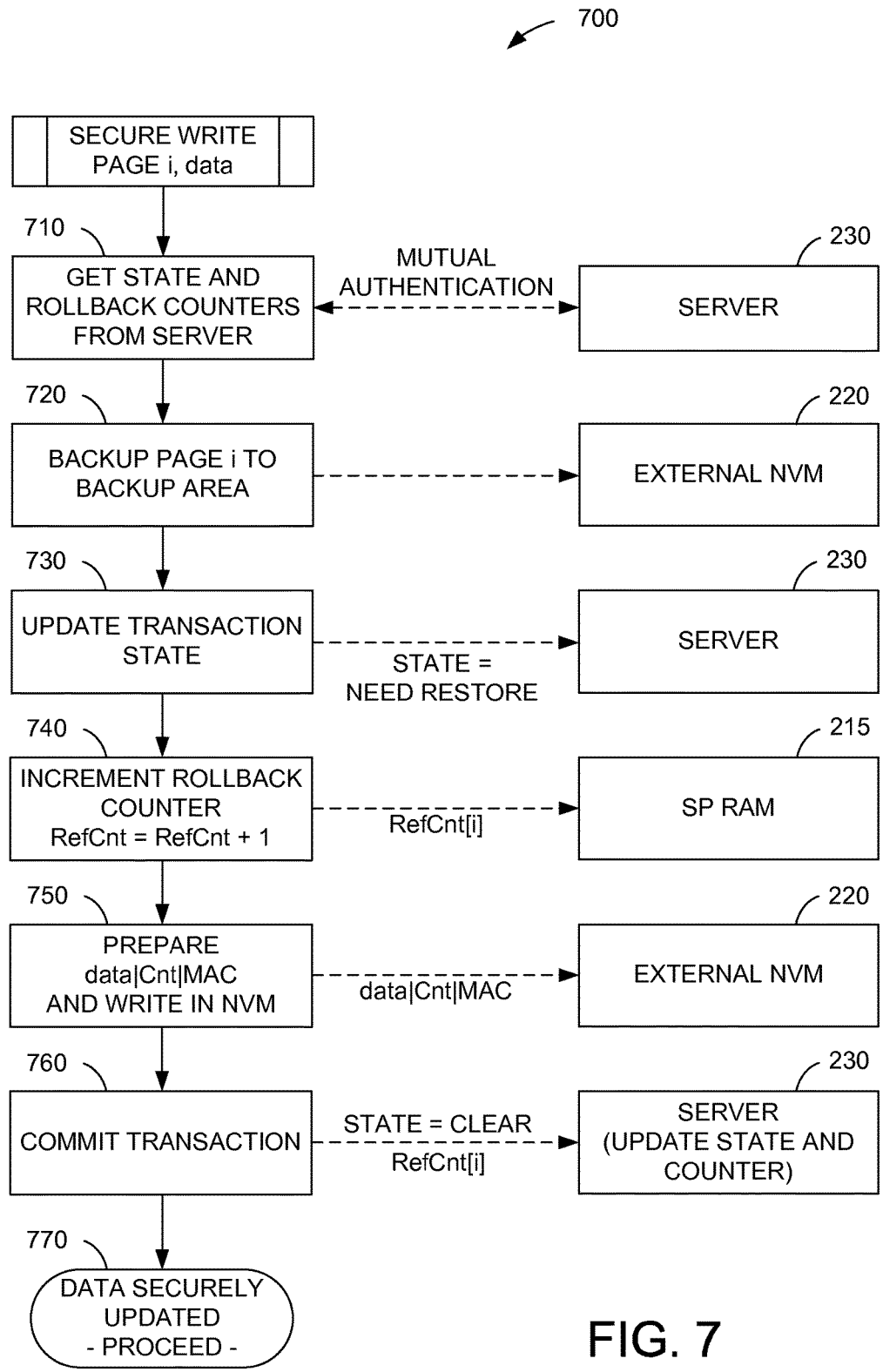
FIG. 7 is a block diagram of a method for secure write of a page.

With reference to FIGS. 2 and 7, the secure processor 225 may perform a secure write process (700) to write data to the external nonvolatile memory 220. To start a write transaction, a secure connection is established with the secure remote server 230 using mutual authentication, and subsequent messages with the secure remote server 230 are exchanged with that secure communication channel (step 710). The target page i may be backed up to a backup area (step 720). If a power loss/failure occurs during the write transaction/operation, the data in the page may be corrupted. The backup copy may be used to restore the data in the page. The transaction state is updated to need restore and may be stored on the secure remote server 230 (step 730). The anti-rollback counter RefCnt[i] is incremented and stored in SP RAM (step 740). The data|Cnt|MAC are prepared and written to the nonvolatile memory 220 (step 750). A commit transaction write operation clears the transaction state indicating there is no need to restore the page, and the reference count value RefCnt[i] is stored in the secure remote server 230 (step 760). Accordingly, the data has been securely updated and processing proceeds (step 770).

Alternatively, instead of storing the anti-rollback counter in the nonvolatile memory 220 and the secure remote server 230, and the MAC in the nonvolatile memory, only a hash of the payload data may be stored in the secure remote server. An advantage of using the hash as the data-validity information is less memory overhead is required in the nonvolatile memory. As disadvantages, more data must be stored on the secure remote server (a hash may be at least 256 bits whereas a count may be about 64 bits). Also, each time the data is updated, the full hash must be sent to the secure remote server whereas with the anti-rollback counter, an only an increment command is required without having to send the actual payload data.

Figure 8:
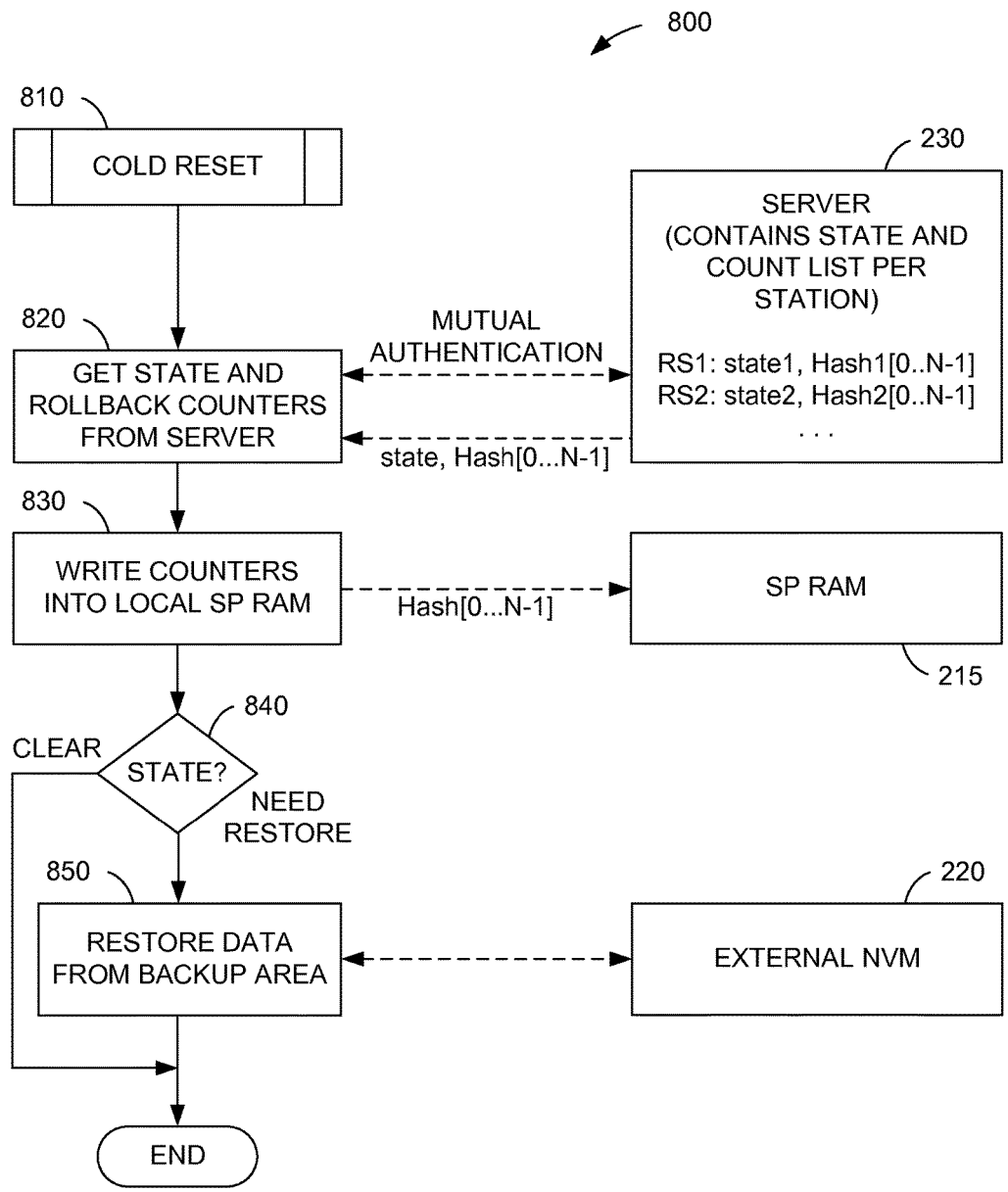
FIG. 8 is a flow diagram of another method for a cold reset.

With reference to FIGS. 2 and 8, after a power loss or the like, an alternate cold reset or startup/boot process 800 is executed by the secure processor (SP) 225 (step 810). A secure connection is established with the secure remote server 230 using mutual authentication. The secure processor 225 gets/retrieves the state and hash values (data-validity information) from the secure remote server 230 (step 820). There may be N hash values Hash(0 . . . N−1) to accommodate a desired level of granularity of data segments in the nonvolatile memory 220. The secure processor writes the hash value to the secure memory 215, i.e., the SP RAM (step 830). The hash values may be stored in the SP RAM for purposes of efficiency. Synchronizing with the server 230 is required for the next startup when the SP RAM loses its contents due to a cold reset/power loss. A system state is checked (step 840), and if a restore is needed, the original data stored in the backup area may be restored to the nonvolatile memory 220 from a backup area (step 850). The startup process then ends.

Figure 9:
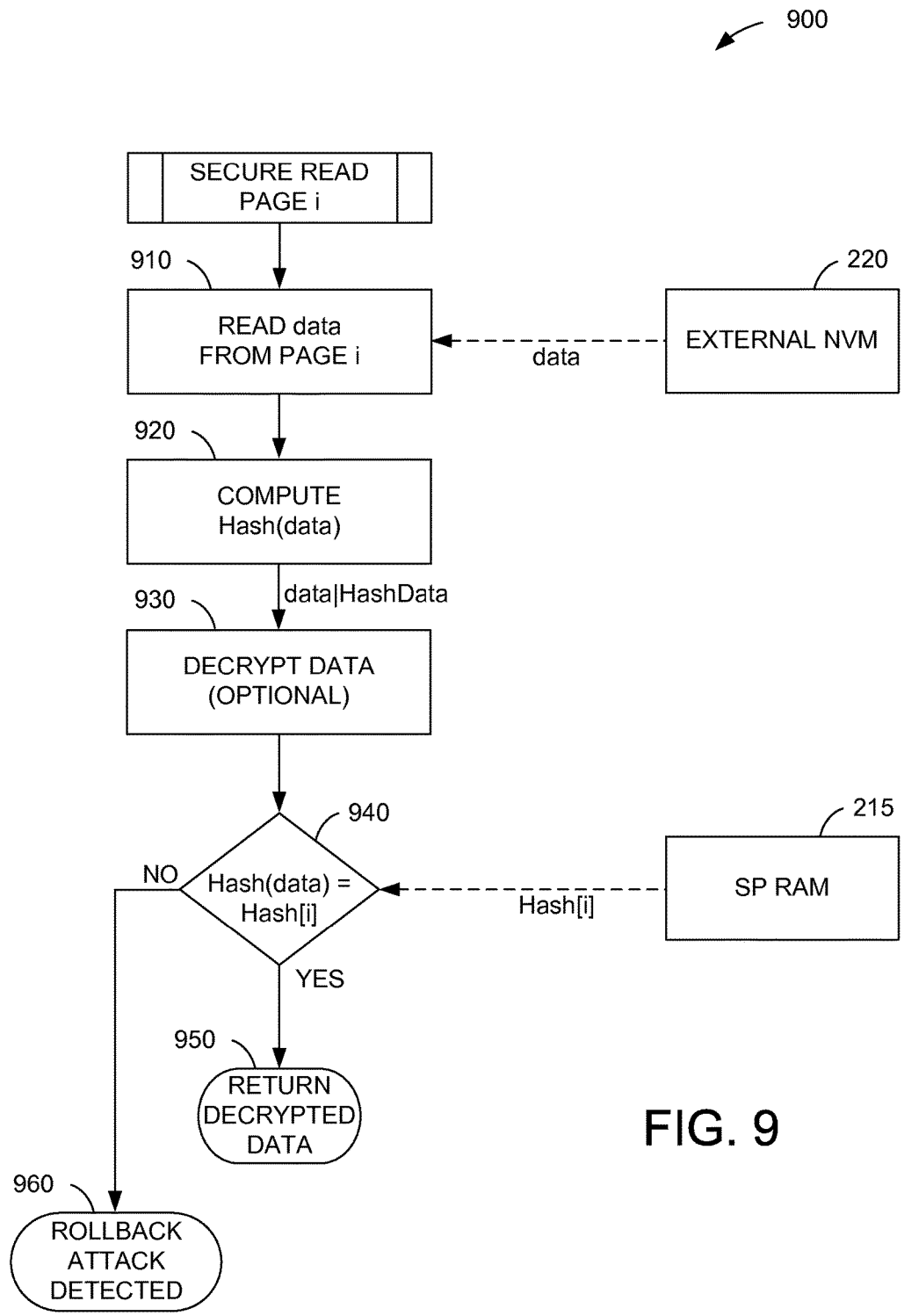
FIG. 9 is a flow diagram of another method for a secure read of a page.

With reference to FIGS. 2 and 9, the secure processor 225 may perform a secure read process (900) to read data from the external nonvolatile memory 220 (step 910). Each page i or data blob (block of bytes) may contain only the payload data. The hash may be computed from the payload data (step 920). If an attacker replaces the page/blob with an older version, or anything else, the hash computed based on the read data will not match. The payload data may be decrypted if encrypted for confidentiality (step 930). The computed hash Hash(data) is compared with the reference hash Hash[i] stored in the SP RAM (step 940). If an anti-rollback attack is detected, i.e., the data is invalid (step 950), then the system is alerted. Otherwise, the data is returned (step 960). Although an attacker may replace a page/blob by an older version, the calculated hash value will not match the earlier calculated hash value securely retrieved from the remote server 230 and stored in the SP RAM.

Figure 10:
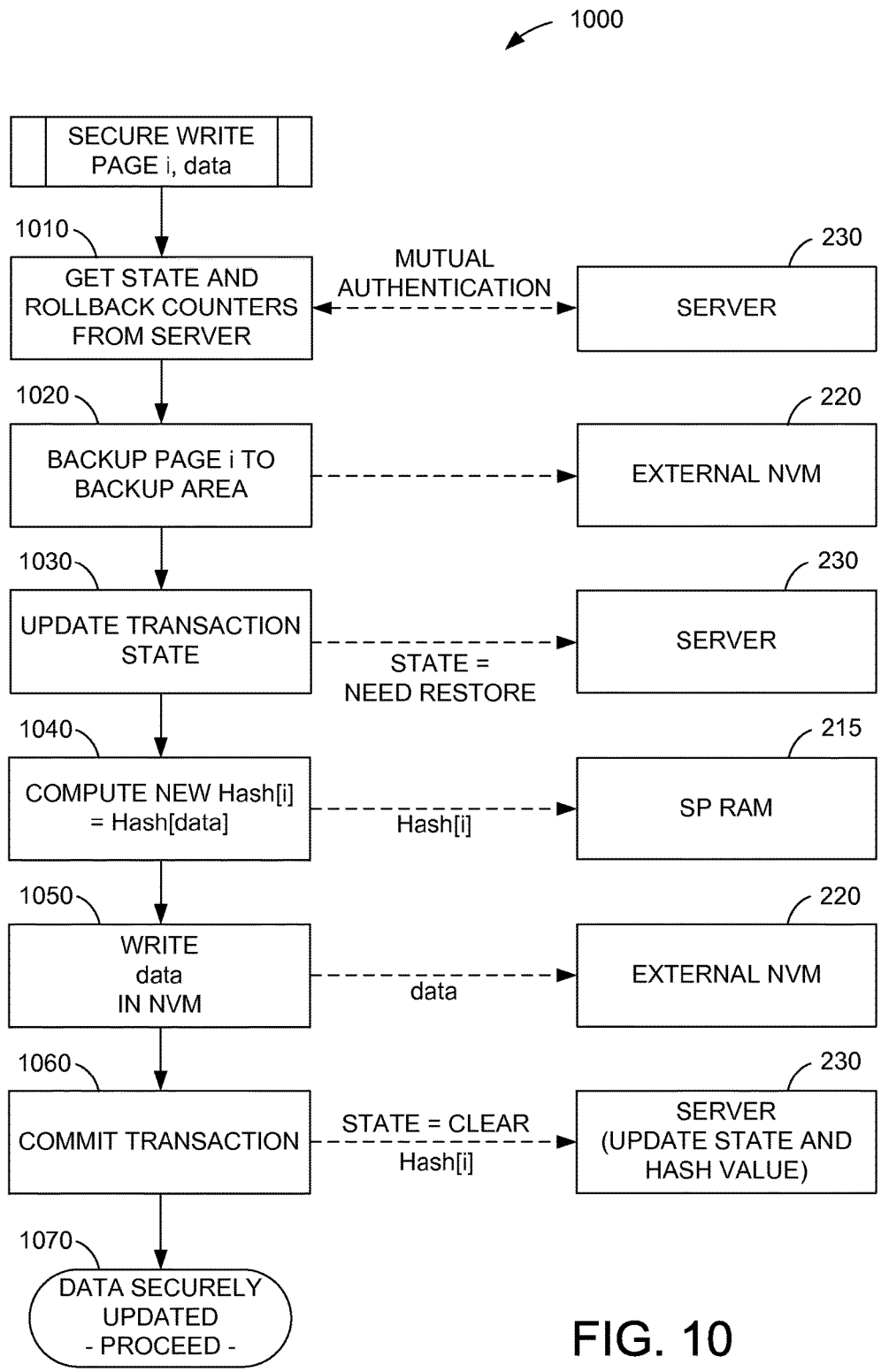
FIG. 10 is a block diagram of another method for secure write of a page.

With reference to FIGS. 2 and 10, the secure processor 225 may perform a secure write process (1000) to write data to the external nonvolatile memory 220. To start a write transaction, a secure connection is established with the secure remote server 230 using mutual authentication, and subsequent messages with the secure remote server 230 are exchanged with that secure communication channel (step 1010). The target page i may be backed up to a backup area (step 1020). The transaction state is updated to need restore and may be stored on the secure remote server 230 (step 1030). The new hash value Hash[i] is computed and stored in SP RAM (step 1040). The payload data is written to the nonvolatile memory 220 (step 1050). A commit transaction write operation clears the transaction state indicating there is no need to restore the page, and the hash value Hash[i] is stored in the secure remote server 230 (step 1060). Accordingly, the data has been securely updated and processing proceeds (step 1070).

With reference to FIG. 1, a wireless remote station (RS) 102 may communicate with one or more base stations (BS) 104 of a wireless communication system 100. The RS may be a mobile station. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An integrated circuit, comprising:
  a processor configured to:
    retrieve first data-validity information, associated with first data stored in an external nonvolatile memory, from a secure remote server over a secure communication channel, wherein the processor uses mutual authentication with the secure remote server to secure the secure communication channel;
    retrieve the first data from the external nonvolatile memory without using the secure communication channel;
    obtain second data-validity information associated with the first data;
    compare the first data-validity information with the second data-validity information to generate a comparison value; and
    determine, based on the comparison value, whether the first data is valid.

2. The integrated circuit of claim 1, wherein to obtain the second data-validity information comprises to retrieve the second data-validity information from the external nonvolatile memory with the first data.

3. The integrated circuit of claim 2, wherein:
  the processor is further configured to:
    verify an integrity of the first data and the second data-validity information using an authentication code stored in the external nonvolatile memory and retrieved with the first data and the second data-validity information.

4. The integrated circuit of claim 2, wherein the first data-validity information comprises a count value, and the second data-validity information comprises a count value.

5. The integrated circuit of claim 2, wherein the first data-validity information comprises a timestamp value, and the second data-validity information comprises a timestamp value.

6. The integrated circuit of claim 1, wherein to obtain the second data-validity information comprises to calculate the second data-validity information from the first data.

7. The integrated circuit of claim 6, wherein:
  to calculate the second data-validity information from the first data comprises to calculate a hash based on the first data stored in the external nonvolatile memory; and
  the first data-validity information comprises a hash based on the first data.

8. The integrated circuit of claim 1, further comprising:
  a secure volatile memory configured to store the first data-validity information;
  wherein the processor is a secure processor further configured to:
    store the first data-validity information in the secure volatile memory.

9. The integrated circuit of claim 8, wherein the secure processor is further configured to:
  update the first data-validity information;
  write second data to the non-volatile memory over the first data;
  write the updated first data-validity information to the secure volatile memory; and
  forward the updated first data-validity information to the secure remote server over the secure communication channel.

10. The integrated circuit of claim 9, wherein the secure processor is further configured to:
  update the second data-validity information.

11. A remote station, comprising:
  an external nonvolatile memory; and
  a processor configured to:
    retrieve first data-validity information, associated with first data stored in the external nonvolatile memory, from a secure remote server over a secure communication channel, wherein the processor uses mutual authentication with the secure remote server to secure the secure communication channel;
    retrieve the first data from the nonvolatile memory without using the secure communication channel;
    obtain second data-validity information associated with the first data;

compare the first data-validity information with the second data-validity information to generate a comparison value; and
determine, based on the comparison value, whether the first data is valid.

12. The remote station of claim 11, wherein to obtain the second data-validity information comprises to retrieve the second data-validity information from the nonvolatile memory with the first data.

13. The remote station of claim 12, wherein the processor is further configured to:
verify an integrity of the first data and the second data-validity information using an authentication code stored in the nonvolatile memory and retrieved with the first data and the second data-validity information.

14. The remote station of claim 11, wherein to obtain the second data-validity information comprises to calculate the second data-validity information from the first data.

15. The remote station of claim 14, wherein:
to calculate the second data-validity information from the first data comprises to calculate a hash based on the first data stored in the nonvolatile memory; and
the first data-validity information comprises a hash based on the first data.

16. The remote station of claim 11, further comprising:
a secure volatile memory configured to store the first data-validity information;
wherein the processor is a secure processor further configured to:
store the first data-validity information in the secure volatile memory.

17. The remote station of claim 16, wherein the secure processor is further configured to:
update the first data-validity information;
write second data to the non-volatile memory over the first data;
write the updated first data-validity information to the secure volatile memory; and
forward the updated first data-validity information to the secure remote server over the secure communication channel.

18. The remote station of claim 17, wherein the secure processor is further configured to:
update the second data-validity information.

19. A remote station, comprising:
means for retrieving first data-validity information, associated with first data stored in a nonvolatile memory, from a secure remote server over a secure communication channel, wherein mutual authentication with the secure remote server is used to secure the secure communication channel;
means for retrieving the first data from the nonvolatile memory without using the secure communication channel;
means for obtaining second data-validity information associated with the first data;
means for comparing the first data-validity information with the second data-validity information to generate a comparison value; and
means for determining, based on the comparison value, whether the first data is valid.

20. The remote station of claim 19, further comprising: means for storing the first data-validity information.

21. The remote station of claim 19, wherein the means for obtaining the second data-validity information comprises means for retrieving the second data-validity information from the nonvolatile memory with the first data.

22. The remote station of claim 21, further comprising:
means for verifying an integrity of the first data and the second data-validity information using an authentication code stored in the nonvolatile memory and retrieved with the first data and the second data-validity information.

23. The remote station of claim 19, wherein the means for obtaining the second data-validity information comprises means for calculating the second data-validity information from the first data.

24. The remote station of claim 23, wherein:
the means for calculating the second data-validity information from the first data comprises means for calculating a hash based on the first data stored in the nonvolatile memory; and
the first data-validity information comprises a hash based on the first data.

25. A non-transitory computer-readable medium, comprising:
code for causing a computer to retrieving first data-validity information, associated with first data stored in an external nonvolatile memory, from a secure remote server over a secure communication channel, wherein mutual authentication with the secure remote server is used to secure the secure communication channel;
code for causing the computer to retrieve the first data from the external nonvolatile memory without using the secure communication channel;
code for causing the computer to obtain second data-validity information associated with the first data;
code for causing the computer to compare the first data-validity information with the second data-validity information to generate a comparison value; and
code for causing the computer to determine, based on the comparison value, whether the first data is valid.

26. The non-transitory computer-readable medium of claim 25, further comprising:
code for causing the computer to store the first data-validity information in volatile memory.

27. The non-transitory computer-readable medium of claim 25, wherein the code for causing the computer to obtain the second data-validity information comprises code for causing the computer to retrieve the second data-validity information from the external nonvolatile memory with the first data.

28. The non-transitory computer-readable medium of claim 27, further comprising:
code for causing the computer to verify an integrity of the first data and the second data-validity information using an authentication code stored in the external nonvolatile memory and retrieved with the first data and the second data-validity information.

29. The non-transitory computer-readable medium of claim 25, wherein the code for causing the computer to obtain the second data-validity information comprises code for causing the computer to calculate the second data-validity information from the first data.

30. The non-transitory computer-readable medium of claim 29, wherein:
the code for causing the computer to calculate the second data-validity information from the first data comprises code for causing the computer to calculate a hash based on the first data stored in the external nonvolatile memory; and the first data-validity information comprises a hash based on the first data.

* * * * *